US008288693B2

(12) United States Patent
Weiss et al.

(10) Patent No.: US 8,288,693 B2
(45) Date of Patent: Oct. 16, 2012

(54) FLAT HEATING ELEMENT

(75) Inventors: Michael Weiss, Benediktbeuren (DE); Simone Köhler, Ostfildern (DE); Peter Tremmel, Aichach (DE)

(73) Assignee: W.E.T. Automotive Systems AG, Odelzhausen (DE)

( * ) Notice: Subject to any disclaimer, the term of this patent is extended or adjusted under 35 U.S.C. 154(b) by 999 days.

(21) Appl. No.: 10/598,453

(22) PCT Filed: Mar. 4, 2005

(86) PCT No.: PCT/DE2005/000389

§ 371 (c)(1), (2), (4) Date: Jun. 12, 2007

(87) PCT Pub. No.: WO2005/089019

PCT Pub. Date: Sep. 22, 2005

(65) Prior Publication Data

US 2007/0278214 A1 Dec. 6, 2007

(51) Int. Cl.

| | |
|---|---|
| ***H05B 3/03*** | (2006.01) |
| ***H05B 3/18*** | (2006.01) |
| ***H05B 3/36*** | (2006.01) |
| ***B60N 2/56*** | (2006.01) |

(52) U.S. Cl. ......... 219/541; 219/528; 219/545; 219/549

(58) Field of Classification Search .................. 219/545, 219/211, 212, 529, 549, 542; 174/102, 113, 174/255

See application file for complete search history.

(56) References Cited

U.S. PATENT DOCUMENTS 2,327,756 A * 8/1943 Adamson ...................... 219/545
2,375,997 A * 5/1945 Larson .......................... 219/545
2,745,943 A * 5/1956 Safford ......................... 219/542
3,472,289 A * 10/1969 Riordan et al. ........... 139/425 R
3,659,338 A * 5/1972 McFarlane ...................... 29/611
3,721,799 A * 3/1973 Carlstrom ..................... 219/212
4,245,149 A 1/1981 Fairlie (Continued)

FOREIGN PATENT DOCUMENTS

DE 0939579 B1 2/1956

(Continued)

OTHER PUBLICATIONS

Co-pending German Application Serial No. DE 10 2004 037 410.4.

(Continued)

*Primary Examiner* — Joseph M Pelham
*Assistant Examiner* — Vinod D Patel
(74) *Attorney, Agent, or Firm* — Dobrusin & Thennisch PC

(57) ABSTRACT

The invention relates to a heating element (20), in particular for heating user contact surfaces of a passenger compartment of a vehicle, comprising a) at least one heating zone in which at least one first electrical conductor strand is disposed for heating a passenger of the automotive vehicle; b) at least one additional second conductor strand for supplying electrical energy into the at least one first conductor strand for heating the heating zone; c) a contact area in which the at least one additional second conductor strand is connected, in an electrically conductive manner, to the at least one first conductor strand for heating the heating zone; and wherein at least one of the first or second conductor strands includes at least one filament-like inner strand core comprising a polyamide, a carbon fiber, a polypropylene, or a polyester and at least one jacket layer that includes silver, copper, gold, nickel, or an alloy thereof.

20 Claims, 5 Drawing Sheets

U.S. PATENT DOCUMENTS

Figure 1:
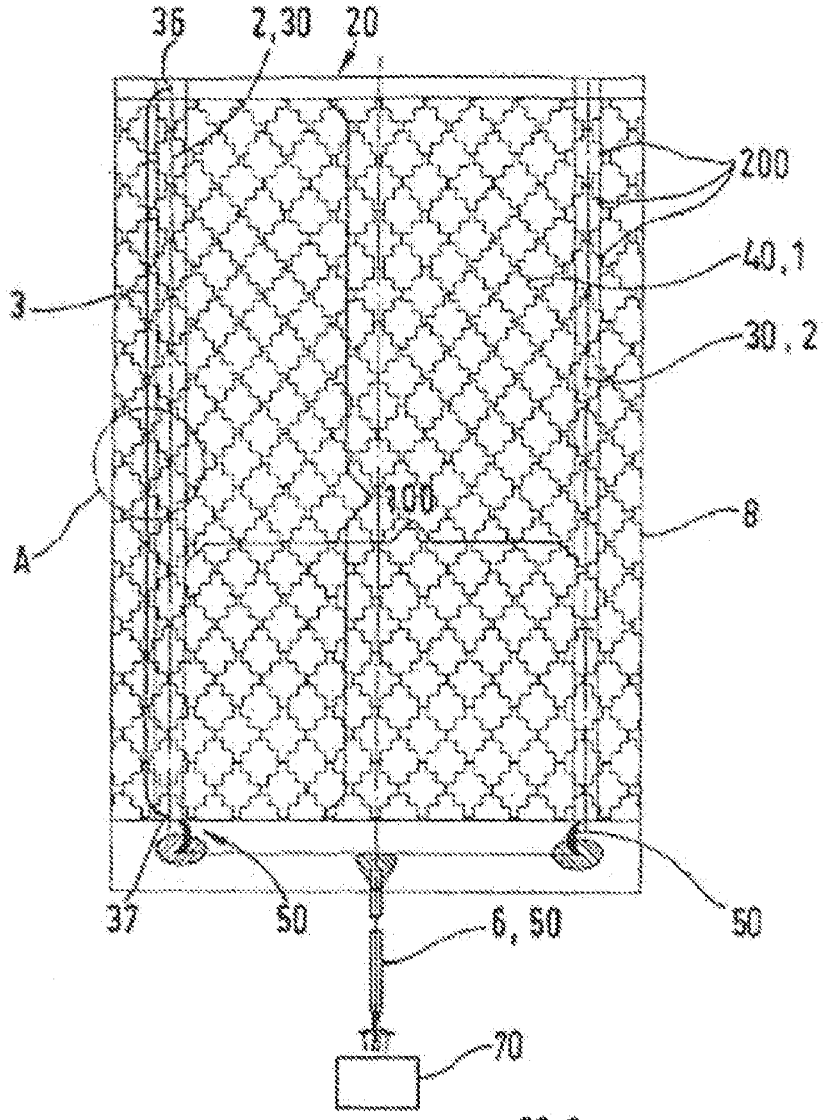

| | | | | |
|---|---|---|---|---|
| 4,309,597 | A * | 1/1982 | Crowley | 219/549 |
| 4,540,878 | A * | 9/1985 | Sato | 219/545 |
| 5,008,517 | A * | 4/1991 | Brekkestran et al. | 219/211 |
| 5,394,507 | A * | 2/1995 | Okamoto | 392/480 |
| 5,422,462 | A * | 6/1995 | Kishimoto | 219/545 |
| 5,484,983 | A * | 1/1996 | Roell | 219/545 |
| 5,824,994 | A | 10/1998 | Noda et al. | |
| 5,824,996 | A | 10/1998 | Kochman et al. | |
| 5,861,610 | A | 1/1999 | Weiss | |
| 5,904,874 | A | 5/1999 | Winter | |
| 5,921,314 | A | 7/1999 | Schuller et al. | |
| 6,057,530 | A | 5/2000 | Gurevich | |
| 6,064,037 | A | 5/2000 | Weiss et al. | |
| 6,084,217 | A | 7/2000 | Bulgajewski | |
| 6,111,234 | A | 8/2000 | Batliwalla et al. | |
| 6,147,332 | A | 11/2000 | Holmberg et al. | |
| 6,150,642 | A | 11/2000 | Weiss et al. | |
| 6,164,719 | A | 12/2000 | Rauh | |
| 6,189,487 | B1 | 2/2001 | Owen et al. | |
| 6,229,123 | B1 | 5/2001 | Kochman et al. | |
| 6,294,758 | B1 | 9/2001 | Masao et al. | |
| 6,303,905 | B1 * | 10/2001 | Chiles et al. | 219/213 |
| 6,369,369 | B2 | 4/2002 | Kochman et al. | |
| 6,415,501 | B1 | 7/2002 | Schlesselman | |
| 6,426,485 | B1 | 7/2002 | Bulgajewski et al. | |
| 6,439,658 | B1 | 8/2002 | Ganz et al. | |
| 6,452,138 | B1 | 9/2002 | Kochman et al. | |
| 6,483,087 | B2 | 11/2002 | Gardner et al. | |
| 6,501,055 | B2 | 12/2002 | Rock et al. | |
| 6,563,094 | B2 * | 5/2003 | Kochman et al. | 219/549 |
| 6,664,512 | B2 | 12/2003 | Horey et al. | |
| 6,680,465 | B2 * | 1/2004 | O'Connor | 219/544 |
| 6,686,562 | B1 | 2/2004 | Weiss et al. | |
| 6,710,303 | B1 | 3/2004 | Lorenzen | |
| 6,713,733 | B2 * | 3/2004 | Kochman et al. | 219/549 |
| 6,737,610 | B1 * | 5/2004 | Horn et al. | 219/212 |
| 6,838,647 | B2 | 1/2005 | Nagele | |
| 6,906,293 | B2 | 6/2005 | Schmiz et al. | |
| 6,965,081 | B2 * | 11/2005 | Eves et al. | 174/105 R |
| 7,040,710 | B2 | 5/2006 | White et al. | |
| 7,049,557 | B2 * | 5/2006 | DeAngelis et al. | 219/545 |
| 7,053,344 | B1 | 5/2006 | Surjan et al. | |
| 7,202,444 | B2 | 4/2007 | Bulgajewski | |
| 7,205,510 | B2 | 4/2007 | Howick | |
| 7,223,948 | B2 | 5/2007 | Howick et al. | |
| 7,306,283 | B2 | 12/2007 | Howick et al. | |
| 7,510,239 | B2 | 3/2009 | Stowe | |
| 7,560,670 | B2 | 7/2009 | Lorenzen et al. | |
| 2001/0002669 | A1 * | 6/2001 | Kochman et al. | 219/545 |
| 2002/0117495 | A1 | 8/2002 | Kochman et al. | |
| 2003/0024727 | A1 | 2/2003 | Petrenko | |
| 2004/0144771 | A1 * | 7/2004 | Kleshchik | 219/529 |
| 2005/0061802 | A1 * | 3/2005 | Rock | 219/545 |
| 2005/0067404 | A1 * | 3/2005 | DeAngelis et al. | 219/545 |
| 2005/0067405 | A1 * | 3/2005 | DeAngelis et al. | 219/549 |
| 2005/0103773 | A1 * | 5/2005 | Diemer et al. | 219/528 |
| 2005/0200179 | A1 | 9/2005 | Bevan et al. | |
| 2005/0263519 | A1 | 12/2005 | Michelmann | |
| 2006/0151476 | A1 * | 7/2006 | Green et al. | 219/545 |
| 2007/0257027 | A1 | 11/2007 | Krobok | |
| 2007/0278210 | A1 | 12/2007 | Weiss | |
| 2008/0290080 | A1 | 11/2008 | Weiss | |
| 2010/0187214 | A1 * | 7/2010 | Weiss | 219/217 |
| 2011/0290785 | A1 | 12/2011 | Schaeffer et al. | |
| 2012/0013433 | A1 | 1/2012 | Rauh et al. | |

FOREIGN PATENT DOCUMENTS

| | | | |
|---|---|---|---|
| DE | 2157356 | A1 | 5/1973 |
| DE | 3513909 | | 10/1986 |
| DE | 38 32 342 | | 7/1989 |
| DE | 4019447 | | 2/1991 |
| DE | 4020580 | A1 | 1/1992 |
| DE | 4124684 | A1 | 1/1993 |
| DE | 4101290 | C2 | 11/1994 |
| DE | 19638372 | | 3/1997 |
| DE | 199 20 451 | | 12/1999 |
| DE | 10112405 | A1 | 10/2001 |
| DE | 698 06 636 | T | 4/2003 |
| DE | 10243584 | A1 | 4/2003 |
| DE | 10206336 | A1 | 9/2003 |
| DE | 10055141 | C5 | 7/2010 |
| EP | 0758 479 | B1 | 5/1998 |
| EP | 1132028 | A | 9/2001 |
| EP | 1261264 | B1 | 8/2004 |
| EP | 1783785 | A | 5/2007 |
| FR | 2263657 | A | 10/1975 |
| FR | 2591839 | A | 6/1987 |
| JP | 03145089 | A | 6/1991 |
| JP | 2001-217058 | A | 8/2001 |
| JP | 2003/332030 | A | 11/2003 |
| JP | 2004/249092 | A | 1/2004 |
| WO | 94/09684 | A1 | 5/1994 |
| WO | 02/06914 | A1 | 1/2002 |
| WO | 2004/082989 | | 3/2004 |
| WO | 2004/114513 | A1 | 12/2004 |
| WO | 2005/027580 | A1 | 3/2005 |
| WO | 2005/047056 | | 5/2005 |
| WO | 2005/089019 | A2 | 9/2005 |
| WO | 2007/065424 | A | 6/2007 |
| WO | 2009/049577 | A1 | 4/2009 |

OTHER PUBLICATIONS

Co-pending U.S. Appl. No. 11/803,486, filed May 15, 2007, published as 2007-0278210.

Co-pending U.S. Appl. No. 11/800,669, filed May 7, 2007, published as 2007-0257027.

International Search Report dated Sep. 30, 2005, PCT/DE2005/000389.

Co-pending U.S. Appl. No. 12/738,345, filed Aug. 29, 2008, published as 2011/0290785 on Dec. 1, 2011.

Co-pending U.S. Appl. No. 12/096,266, filed Dec. 11, 20006, published as 2008/0290080 on Nov. 27, 2008.

Co-pending U.S. Appl. No. 13/181,600, filed Jan. 13, 2011, published as 2012/0013433, on Jan. 19, 2012.

* cited by examiner

FLAT HEATING ELEMENT

The present invention relates to a flat heating element, in particular for heating user-contacted surfaces of a passenger compartment of a vehicle, with at least one heating zone in which at least one electrical conductor strand is disposed for heating, with at least one additional conductor strand for supplying electrical energy into the at least one conductor strand for heating the heating zone, and with one contact area in which the conductor strand for supplying electrical energy is connected, in an electrically conductive manner, to the at least one conductor strand for heating the heating zone.

THE STATE OF THE ART

Known are flat heating elements with two or more contact conductors which are connected, in an electrically conductive manner, to one another by several heat conductors. These heat conductors and/or contact conductors can, for example, consist of copper or of another suitable conductor material with sufficient electrical conductivity and can in given cases be shielded and/or reinforced by an outer insulation. Conductors which consist at least partially of copper can, however, only be mechanically stressed to a limited extent so that after longer-lasting use faults due to material fatigue and/or breaks can occur. This is due primarily to the insufficient resistance to reverse bending stresses of the copper material. In heating elements of this type breakage of contact and/or heating elements can occur. In this case, an interruption of the supply of electricity occurs at the point of this break. The heating element is then, at least in the areas through which current no longer flows, no longer capable of functioning.

From DE 41 01 290 it is a known practice to contact a plurality of heat conductors with a plurality of contact conductors in order in this way to create redundancy in case of the failure of individual conductors. However, there are instances of application in which the heating elements described there are still not always sufficiently robust and reliable.

It is a known practice to apply a silver coating to copper conductors in order to protect them against corrosion. However, if the silver is not applied so as to be pore-tight, the copper can be attacked nonetheless. Furthermore, the silver diffuses into the copper over time. Due to this, a boundary layer of Ag—Cu alloy forms which is very brittle. Breaks of the boundary layer form initial cracks which also endanger the conductor.

In order to provide a remedy for this problem, so-called jacketed wires can be used in which electrical conductors with a steel core and a copper jacket are provided. A jacketed wire with a platinum jacket and a core of a material containing a precious metal is known from DE 38 32 342 C1. The core can be coordinated with criteria such as flexibility, tear-resistance, tensile strength, and resistance to reverse bending stresses, while the jacket can be optimized with regard to the desired electrical properties.

A jacketed wire with a core of stainless steel wire and a jacket of copper is known from DE 196 38 372 A1. Finally, a jacketed wire in which the jacket can consist of steel and the core of copper, or optionally vice versa, is described in DE 102 06 336 A1.

An important disadvantage of these known combinations of material consists in the relatively high costs and the only limited resistance to corrosion of the jacketed wires. The cooper jacketing does indeed conduct the electrical current sufficiently well for most instances of application. However, it is not sufficiently resistant to corrosion for many intended uses.

From JP 2001-217058 a heat conductor is known in which a plurality of carbon fibers are jacketed by one shrink-on tube. Such an arrangement is, however, not very resistant to breaking.

DEFINITIONS

In the following, important terms of this specification are explained.

A strand is an elongated entity whose longitudinal dimensions far exceed its cross sectional dimensions. Preferably, the two dimensions of the cross section are approximately equal. Preferably, the entity is flexibly elastic but in a firm aggregate state.

Here, filament-like is understood to mean that the object thus designated is formed of a short or long fiber or of a monophilic fiber or multifilament thread.

A conductor strand is a strand in which one, several, or many filament-like electrical conductors extend, preferably essentially along the longitudinal direction of the strand. A conductor strand can itself be built up from a plurality of conductor strands.

A jacketed layer is a layer which directly or indirectly jackets a strand at least in part but is not necessarily the outermost layer jacketing the strand.

A plastic is any synthetic material not occurring in nature, in particular polymers and substances derived therefrom, such as carbon fibers.

Temperature-resistant means that the material in question changes its form and its strength at most insignificantly with every-day changes in temperature, remains chemically stable, and retains the same aggregate state as under standard environmental conditions.

Chemically inactive means inert, that is, even with the action of corrosive substances the object thus designated does not change, at least not with substances such as sweat, carbonic acid, or fruit acids.

Metallization is understood to mean the provision of a metallic coating, e.g., by electroplating or sputtering.

A seating surface is a large-surface, central area of the supporting surface of a seat, said central area being intended for the support of the user's posterior.

A seat's back rest is a large-surface, central area of the supporting surface of a seat, said central area being intended for the support of the user's back.

A seat's flanks are usually a supporting surface's sections on the longitudinal side, offset from the seating surface and usually somewhat elevated, said sections being intended for lateral support of a user, in particular when driving around curves. Here, this term denotes the flanks next to the seating surface for support of the user's thigh as well as the flanks at the back rest for support of the user's shoulders.

"Of a different type" is understood to mean that two objects are different from one another, at least with regard to one property relevant and/or fundamental for the technological fulfillment of their function. In particular, all the features of electrical conductor strands are meant which fundamentally relate to their resistance to stress, their service lifetime, the choice of material, the combinations of materials, the design and dimensions of their cross-sectional forms, and the connection to and contact in the heating element.

THE OBJECT OF THE INVENTION

A goal of the present invention consists in producing a heating element which can be made to be sufficiently long-lasting, corrosion-resistant, and economical.

Accordingly, pursuant to one aspect of the present invention, there is contemplated a heating element (20), in particular for heating user-contacted surfaces of a passenger compartment of a vehicle, with at least one heating zone (100) in which at least one electrical conductor strand (1) is disposed for heating; with at least one additional conductor strand (2) for supplying electrical energy into the at least one conductor strand (1) for heating the heating zone (100); and with one contact area (200) in which the conductor strand (2) for supplying electrical energy is connected, in an electrically conductive manner, to the at least one conductor strand (1) for heating the heating zone (100); characterized by the fact that at least one additional conductor (3) is provided which, in case of local failure of at least one of the conductor strands (1, 2) at a point, forms at least one part of an electrical bridging line which bridges the point of the failure.

The invention may be further characterized by one or any combination of the features described herein, such as the heating element (20) with at least one electrical conductor strand (10) which comprises at least one filament-like inner strand (12) and at least one jacket layer (14) jacketing this inner strand (12) at least in part, characterized by the fact that the jacket layer (14) is electrically conductive; the heating element (20) with at least one electrically heated heating zone (100) and with at least one electrical conductor strand (1, 2) which is provided for at least partial disposition in mechanically stressed zones, characterized by the fact that the heating element (20) comprises at least one interrupter conductor strand (4, 4') whose mechanical stability, in particular its tensile strength and/or its resistance to reverse bending stresses, is less than that of the first conductor strand (1, 2) and whose failure leads to switching off the heating element (20); the heating element (20) characterized by the fact that it is provided, in particular for heating user-contacted surfaces of a passenger compartment of a vehicle, that it is provided with at least one heating zone (100) in which at least one electrical conductor strand (1) is disposed for heating, with at least one additional conductor strand (2) for supplying electrical energy to the at least one conductor strand (1) for heating the heating zone (100), with one contact area (200) in which the conductor strand (2) for supplying electrical energy is connected to the at least one conductor strand (1) for heating the heating zone (100), and that at least one additional conductor (3) is provided which, in case of local failure of at least one of the conductor strands (1, 2) at a point, forms at least one part of an electrical bridging line which bridges the point of the failure; the heating element (20) characterized by the fact that it is provided with at least one electrical conductor strand (10) which comprises at least one filament-like inner strand (12) and at least one jacket layer (14) jacketing this inner strand (12) at least in part, and that the jacket layer (14) is electrically conductive; the heating element (20) characterized by the fact that it is provided with at least one electrically heated heating zone (100) and with at least one electrical conductor strand (1, 2) which is provided for at least partial disposition in mechanically stressed zones, and that the heating element (20) comprises at least one interrupter conductor strand (4, 4') whose mechanical stability, in particular its tensile strength and/or its resistance to reverse bending stresses, is less than that of the first conductor strand (1, 2) and whose failure leads to switching off the heating element (20); the heating element, characterized by the fact that the heating element (20) comprises a plurality of conductor strands (1, 2) for heating and/or for supplying electrical energy which preferably are disposed so as to run approximately parallel to one another and preferably in a meandering manner, and which, in the contact area (200), are electrically connected to at least one but preferably to a plurality of conductor strands (1, 2) of a different type, and that the conductor strand(s) (2) for supplying electrical energy preferably run at least in sections along an edge (5) of the heating zone (100) and are electrically connected there to the at least one heat conductor (1); the heating element, characterized by the fact that the heating element (20) comprises a small number of conductor strands (1) for heating, preferably less than six, preferably less than three, preferably only one conductor strand (1, 10), that these conductor strands (1) are laid with repeated change of direction in a heating zone (100), and that the two ends of the conductor strands (1) are each engaged at one point with the ends of the remaining conductor strands (1) bundled together and preferably are each connected to a pole of a supply line (6) and/or a connecting line (50); the heating element (20), characterized by the fact that at least one additional conductor (3) is disposed at least approximately along one of the conductor strands (1, 2), that it preferably also comprises at least one conductor strand (3*a*); that it electrically contacts, at least indirectly, the conductor strand (1, 2) for heating/for supplying electrical energy at at least two points spaced from one another, and that it is preferably configured in a manner different from this conductor strand (1, 2), in particular in reference to its construction, the materials used, and/or the spatial arrangement with regard to stressed zones of the heating element; the heating element, characterized by the fact that the additional conductor(s) (3)/conductor strands (3*a*) run, at least in sections, along an edge (5) of the heating zone (100) and there are preferably electrically connected to at least two heat conductors (1); the heating element, characterized by the fact that at least one additional conductor (3)/conductor strand (3*a*) is disposed so as to run, at least in sections, preferably in a meandering manner and preferably approximately parallel to a conductor strand (1, 2) for heating/for supplying electrical energy, and/or that the additional conductor (3)/conductor strand (3*a*) is electrically connected to a plurality of conductor strands (1, 2) for heating/for supplying electrical energy, preferably in the contact area (200); the heating element, characterized by the fact that at least a part of the conductor strands (1) for heating touches, in particular crosses, at least a part of the additional conductor (3) and/or a part of the conductor strand (2) for supplying electrical energy in order to form a plurality of supply points (33) at which electrical current can be supplied by the conductor strands (2) for supplying, and/or by the additional conductors (3), into the conductor strands (1) for heating and/or in order to form a plurality of bridging links (42) via which, in case of a break of a conductor strand (2), electrical current in front of the point of the break can be conducted from the conductor strand (2) to the additional conductor (3) and behind the point of the break once again back to the conductor strand (2); the heating element, characterized by the fact that at least one additional conductor (3) is connected only indirectly, in particular only via one or more sections of conductor strands (1, 2), said sections serving as bridging links (42), to a current supply source (70) and preferably is spaced from a supply line (6) and/or connecting lines (50); the heating element, characterized by the fact that at least one conductor strand (1, 2, 3*a*) comprises at least one electrical conductor strand (10), in particular an individual strand (16), which comprises at least one filament-like inner strand (12) and at least one jacket layer (14) which is preferably electrically conductive and jackets this inner strand (12) at least in part and/or which comprises carbon fibers coated with nickel or consists essentially of a nickel alloy or pure nickel, in particular as a multifilament strand; the heating element, characterized by the fact that at least one inner strand (12) comprises a material which is temperature-resistant up to 75° C., preferably up to 150° C., preferably up to 300° C., preferably up to 500° C., preferably up to 1000° C.; the heating element, characterized by the fact that the inner strand (12) can be metallized, that the jacket layer (14) is applied by electroplating to the inner strand (12) and/or that the jacket layer (14) is connected by material to the inner strand (12); the heating element, characterized by the fact that the material of the inner strand (12) can be spun or drawn into filaments or wires, preferably to form filaments with a thickness of less than 100 μm, preferably less than 10 μm, preferably less than 1 μm, preferably less than 0.1 μm, preferably less than 0.01 μm, and/or that the thickness of the jacket layer (14) is between 0.2 and 2 μm, preferably between 0.5 and 1.5 μm, preferably between 0.8 and 1.2 μm and/or that the individual strand (16) and/or the conductor strand (1, 2, 3*a*) has a thickness of less than 1 mm, preferably less than 0.1 mm, preferably less than 10 [sic] mm; the heating element, characterized by the fact that the inner strand (12) is made at least in part of a, preferably elastic and tear-resistant, plastic, preferably at least in part, preferably completely, of a thermoplast, of polyamide, carbon fibers, polypropylene, polyester, polyimide, and/or glass silk, and/or at least in part of steel, and/or that the material of the inner strand (12) has a higher resistance with respect to reverse bending and/or a clearly higher material price and/or a lower tensile or compressive strength than the material of the jacket layer (14); the heating element, characterized by the fact that the jacket layer (14) comprises a surface which is chemically inactive under the usual environmental conditions, at least on its surface pointing outwards (relative to the inner strand); the heating element, characterized by the fact that the jacket layer is made to contain metal, preferably at least in part of an alloy, of nickel with portions of phosphorous, of silver, copper, and/or of gold, preferably of an alloy which is formed essentially completely of silver, copper, gold, and/or nickel, that the jacket layer (14) comprises a metal whose surface can be passivized, and/or that the surface of the jacket layer (14) is oxidized and/or chromatized; the heating element, characterized by the fact that the surface of the jacket layer (14) is coated, in particular with a plastic and/or a lacquer and/or at least in part with polyurethane, PCV, PTFE, PFA, and/or polyester; the heating element, characterized by the fact that at least one conductor strand (1, 2, 3*a*, 10) comprises a plurality of individual strands (16), preferably more than 5, preferably more than 50, preferably more than 100, preferably more than 300; the heating element, characterized by the fact that the individual strands (16) and/or conductor strands (1, 2, 3*a*, 10) of a plurality of such are electrically insulated with respect to one another at least in sections, preferably by at least one individual strand (16) being at least partly insulated by means of an insulation layer (18) on its jacket layer (14), and/or that the conductor strand (10) and/or an individual conductor (16) is jacketed at least in sections with a plastic (72), in particular a heat-activatable plastic; the heating element, characterized by the fact that several individual strands (16) are combined to form a strand bundle (17), and that preferably, in turn, several strand bundles (17) and/or bundles of strand bundles (17) are combined to form a total bundle (19), where the conductor strand (10) and/or at least one individual strand (16) preferably has a spiral arrangement, preferably by twisting, twining, or plying with one another; the heating element, characterized by the fact that the diameter of the conductor strand (10), a strand bundle (17), or a bundle of strand bundles (17), and/or the total bundle (19) is bounded by means of a bounding means and that the heat transfer between the strand/bundle and its environment is changed thereby preferably by being changed at most slightly, preferably by the fact that the bounding means comprises an auxiliary strand winding around the conductor strand (10) or the strand bundle (17) or the total bundle (19) in the manner of a spiral, said auxiliary strand preferably being made in part of electrically conductive material and/or in which the spaces between two adjacent threads of the winding is greater by a multiple than the diameter of the auxiliary strand; the heating element, characterized by the fact that the conductor strand (2, 3*a*, 10) and/or an individual strand (16) has an electrical resistance between 0 and 3 Ω/m, preferably between 0 and 2 Ω/m, preferably between 0.1 and 0.3 Ω/m, and/or that at least one conductor strand (1) for heating the heating element (20) has an electrical resistance between 0.1 and 3 Ω/m, preferably between 0.2 and 0.5 Ω/m; the heating element, characterized by the fact that the conductor strand (1, 2, 3*a*, 10) is worked into a knitted fabric and/or a meshwork, that it is laid on a textile and fastened by means of an additional sewing or knitting thread, that it is integrated into a textile as a sewing thread, and/or that it is glued to at least one textile and/or glued in between two textile layers; the heating element, characterized by the fact that the heating element (20) and/or the conductor strand (1, 2, 3*a*, 10) is disposed at least in part near to the surface in a seat flank of a passenger seat, where the conductor strand (10) preferably serves for heating; the heating element, characterized by the fact that at least one of the interrupter conductor strands (4, 4') is also provided for at least partial disposition in the same mechanically stressed zones as the first conductor strand (1, 2), preferably that the interrupter conductor strand (4, 4') is disposed at least in part at least approximately following the contour of the first conductor strand (1, 2); the heating element, characterized by the fact that the specific and/or absolute electrical conductivity of the interrupter conductor strand (4, 4') is at least as high as that of the first conductor strand (1, 2), preferably twice as high, preferably four times as high; the heating element, characterized by the fact that at least one of the interrupter conductor strands (4, 4') is electrically insulated with respect to the first conductor strand (1, 2) and/or preferably disposed so as to be spaced therefrom, preferably on opposite (surface) sides of a layer-like carrier (8); the heating element, characterized by the fact that the first conductor strand (1, 2) is disposed so as to deviate from the contour of a straight line, preferably zig-zagging and/or meandering, and that at least one of the interrupter conductor strands (4, 4'), unlike those above, is disposed with lesser deviations from the contour of a straight line, preferably approximately in a straight line; the heating element, characterized by the fact that at least one of the interrupter conductor strands (4) is electrically connected in series with the first conductor strand (1, 2); and the heating element, characterized by the fact that at least one of the interrupter conductor strands (4') is monitored by a monitoring device (80) which will switch off the heating element (20) if said interrupter conductor strand fails.

Again, a goal of the present invention consists in producing a heating element which can be made to be sufficiently long-lasting, corrosion-resistant, and economical. For this, the object of claims 1, 2, and 3 offers three efficient possibilities for realization.

The object of one aspect of the invention is particularly protected against failures of individual conductor strands. The object of another aspect of the present invention has an increased resistance to mechanical stress in comparison to traditional conductors. The object of another aspect of the present invention switches off the heating element in case of danger.

The object of another aspect of the present invention has additional reliability due to an alternative addition of an additional conductor. It is contemplated that at least one additional conductor (3) is disposed at least approximately along one of the conductor strands (1, 2), that it preferably also comprises at least one conductor strand (3*a*), that it electrically contacts, at least indirectly, the conductor strand (1, 2) for heating/for supplying electrical energy at at least two points spaced from one another, and that it is preferably configured in a manner different from this conductor strand (1, 2), in particular in reference to its construction, the materials used, and/or the spatial arrangement with regard to stressed zones of the heating element.

A heating element according to one embodiment, wherein the additional conductor(s) (3)/conductor strands (3*a*) run, at least in sections, along an edge (5) of the heating zone (100) and there are preferably electrically connected to at least two heat conductors (1) may describe an expedient form of contact between the additional conductor and heating textile/heat conductor. Further wherein, at least one additional conductor (3)/conductor strand (3*a*) is disposed so as to run, at least in sections, preferably in a meandering manner and preferably approximately parallel to a conductor strand (1, 2) for heating/for supplying electrical energy, and/or that the additional conductor (3)/conductor strand (3*a*) is electrically connected to a plurality of conductor strands (1, 2) for heating/for supplying electrical energy, preferably in the contact area (200), the heating element becomes more secure against failure and resistant in addition.

A heating element comprising at least a part of the conductor strands (1) for heating touches, in particular crosses, at least a part of the additional conductor (3) and/or a part of the conductor strand (2) for supplying electrical energy in order to form a plurality of supply points (33) at which electrical current can be supplied by the conductor strands (2) for supplying, and/or by the additional conductors (3), into the conductor strands (1) for heating and/or in order to form a plurality of bridging links (42) via which, in case of a break of a conductor strand (2), electrical current in front of the point of the break can be conducted from the conductor strand (2) to the additional conductor (3) and behind the point of the break once again back to the conductor strand (2), on the one hand, sufficient contact surfaces at a plurality of supply points between conductor strands for heating and those for supplying current, and on the other hand, the incorporation of an additional conductor in this area forms a network which, in case of a break of individual conductors, can easily conduct current to bypass between the meshes of the network.

In the claimed heating element it is superfluous to contact the additional conductor via a supply line, due to which the mounting of the heating element is clearly simplified.

The heating element comprises particularly robust conductor strands, a plurality of very thin individual conductors which, together, have a large surface and a low resistance, although a large part of the cross section of the strand consists of a non-conducting material (plastic).

The claimed heating element is distinguished by high bearing capacity with low material costs. Its conductor strands are corrosion-resistant.

The claimed heating element makes possible additional safety functions and simple mounting. It comprises conductor strands which, despite a plurality of individual strands, are compactly built and have a low resistance to the transfer of heat.

The conductors are optimized for their respective electrical functions.

The claimed heating element is simple to mount since the conductor strands for supplying electrical energy and/or for heating and/or the conductor strands of the additional conductor can be prefabricated simply, e.g., as band material or endless goods, and, for example, only need to be pressed on.

It has the advantage that, at a border between a seating surface and a seat flank, no complicated protective measures for guiding heat conductors through over the border area (the so-called trench transition) need to be taken. Even if a conductor strand for heating should to be struck by a sewing needle in the further processing of the heating element, then, for example, due to the additional conductor or the choice of material of the conductor strand, the supply of current for the seat flank is ensured.

The claimed heating element switches off particularly safely because the interrupter conductor strand 4 reliably fails earlier than the conductor strand 1, 2 to be protected.

Additional advantageous embodiments of the invention follow from the claims as well as from the following description of the figures.

THE FIGURES

In the following, preferred embodiment examples of the flat heating element according to the invention are explained. Shown are:

FIG. 1 a plan view of a flat heating element

Figure 2:
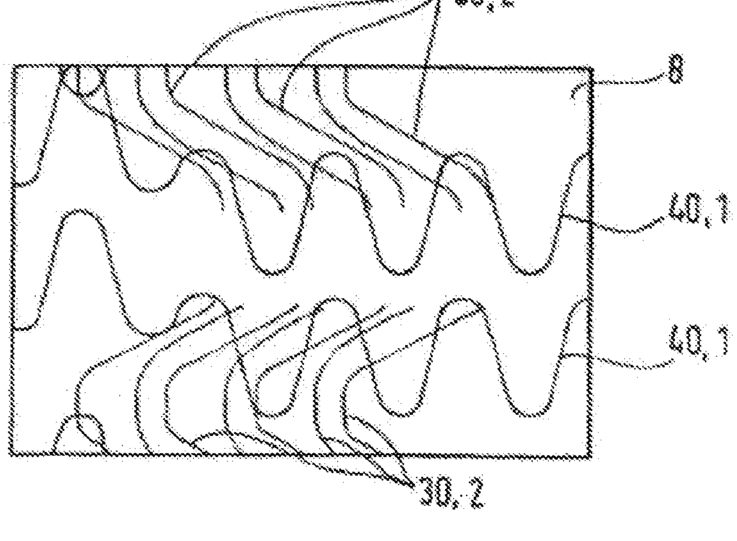

FIG. 2 an enlarged schematic representation of the point of a break of an electrode formed as a litz wire according to the detail A from FIG. 1

Figure 3:
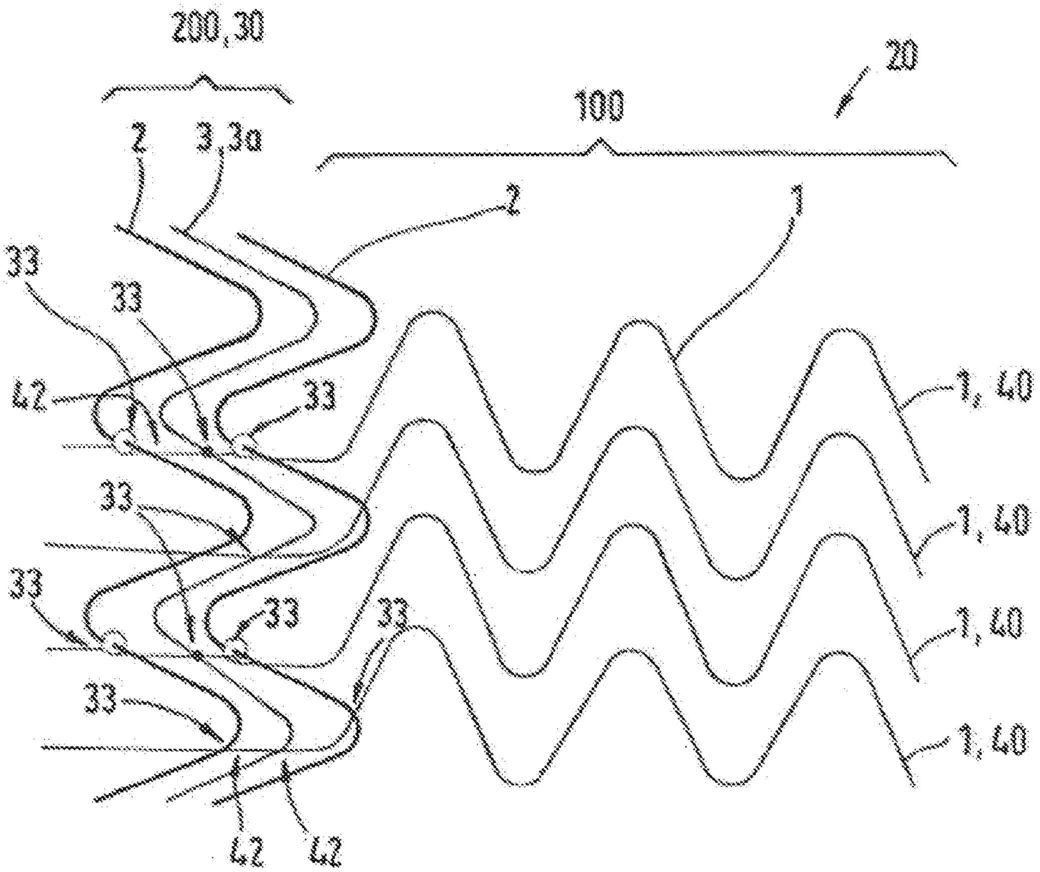

FIG. 3 an enlarged plan view of a detail of a contact area

Figure 4:
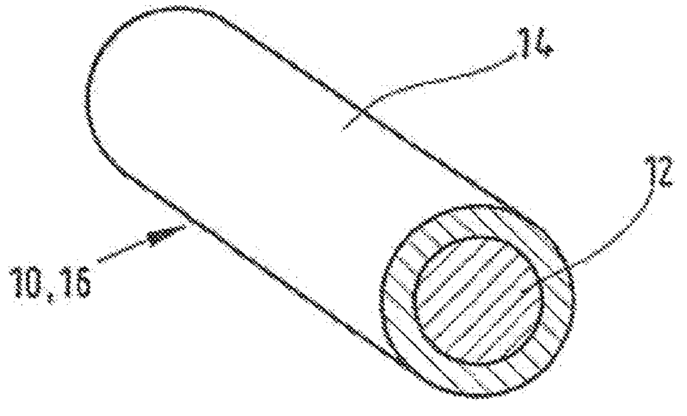

FIG. 4 an enlarged cross section through an electrical conductor strand

Figure 5:
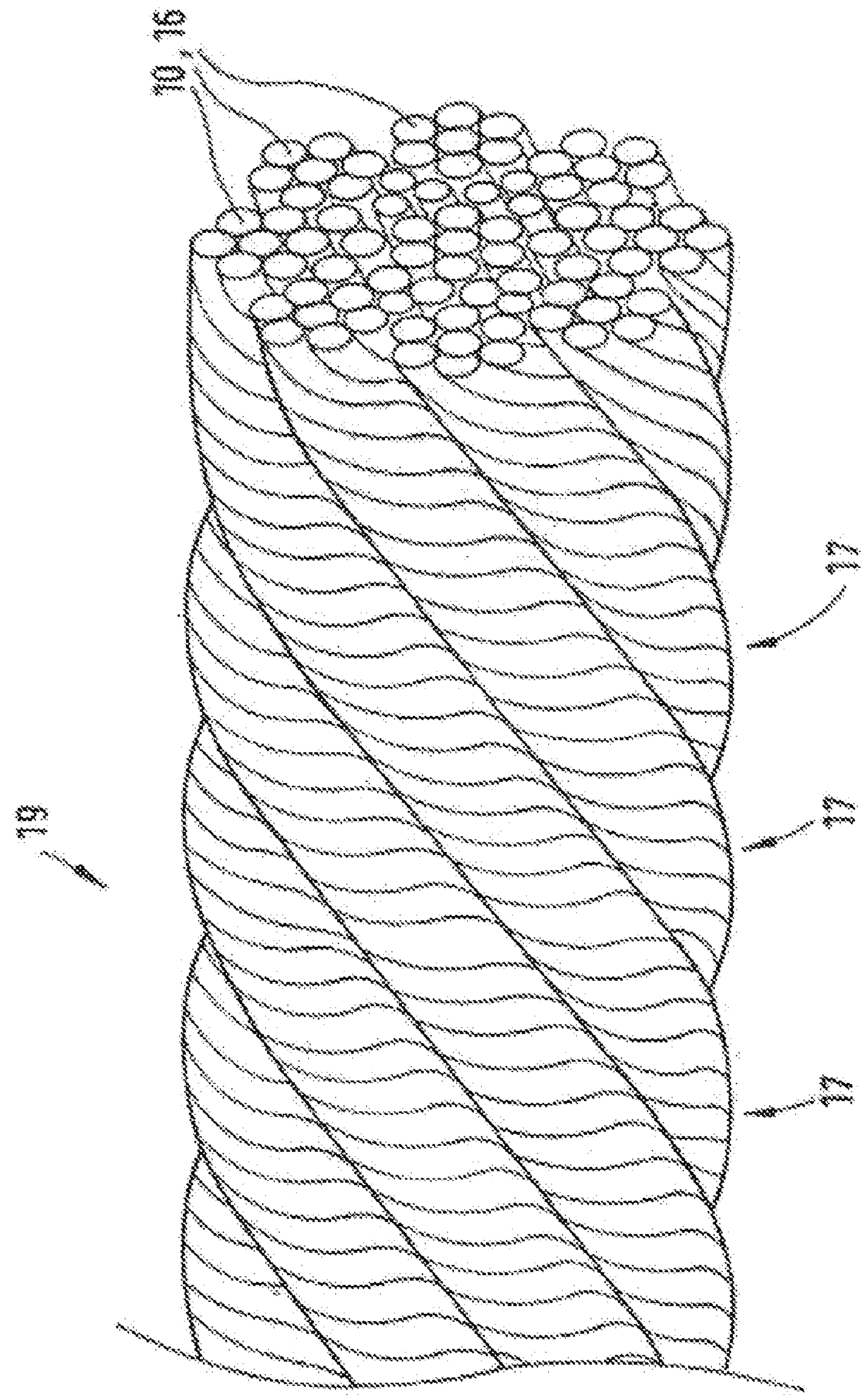

FIG. 5 an enlarged view of a total bundle of a conductor strand

Figure 6:
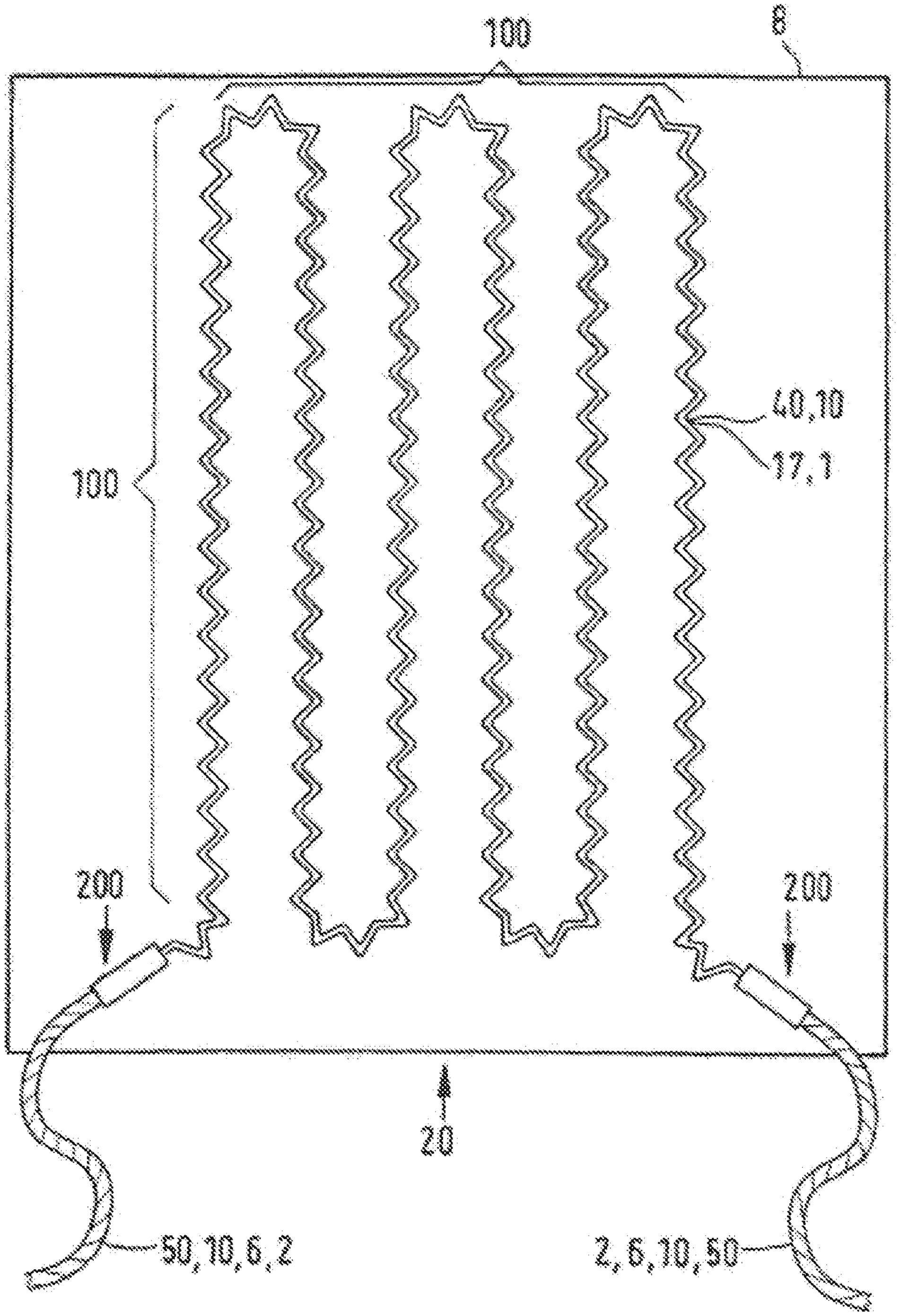

FIG. 6 an alternative to the form of embodiment in FIG. 1

Figure 7:
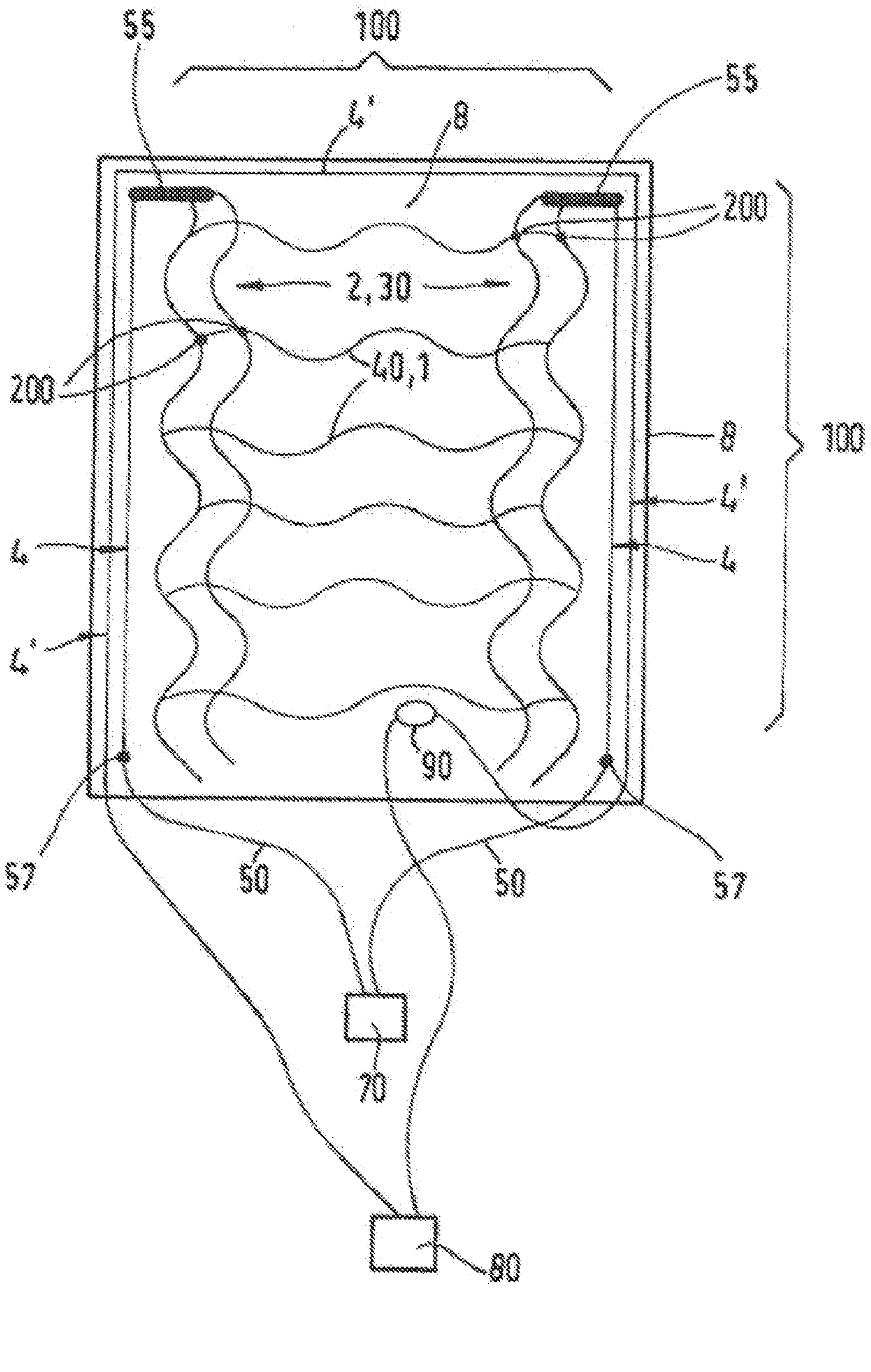

FIG. 7 an plan view of an additional form of embodiment

THE DESCRIPTION OF THE INVENTION

FIG. 1 shows an electrical element 20 with a flat carrier 8, with a pair of electrodes 30 which are disposed thereon spaced from one another and approximately parallel to one another and at contact areas 200 are connected, via a plurality of heating elements 40, to one another. The heat conductors 40 are disposed approximately parallel to one another on the carrier 8 and are electrically connected in parallel. The electrodes 30 for their part are connected, via electrical connecting lines 50, to a current source 70. The heat conductors 40 are formed from conductor strands 1 for heating of the heating element, preferably of carbonized plastic threads. The electrodes 30 are formed of conductor strands 2 for supplying electrical energy into the heating element 20, preferably of copper litz wires.

During operation, current flows from the current source, via a connecting line 6 and the one electrode 30, into the plurality of heat conductors 40. Their heating heats the heating zone 100. From there the current then flows, via the other electrode 30 and the connecting line 6, back to the current source once again. In so doing, the current intensity of the heating current is, for example, between 4 and 5 A at an operating voltage of 12 V.

In FIG. 2 an enlarged view of the junction of an electrode 30 with heat conductors 40 is represented. Shown is a break of conductor strands 2 of the electrode 30. The electrode break represented in FIG. 2 leads to a partial failure of the electrically separated part of the flat heating element 20.

In order to avoid such situations, an additional conductor 3 in the form of embodiment in FIG. 1 electrically connects the end sections 36, 37 of an electrode 30 to one another and is otherwise spaced from the electrode 30 in order not to be subjected to the same stresses.

FIG. 3 shows a form of embodiment of the heating element in which the additional conductor 3 alternatively runs in parallel to the conductor strand 2 of the electrode 30 meandering within the contact area 200. Here, the additional conductor 3 is more robust by orders of magnitude than the conductor strands 2 for supplying electrical energy. In case all the conductor strands 2 should fail, the additional conductor 3 still remains intact due to its high mechanical strength. In the additional conductor 3 the current from the conductor strands 2 in front of the point of the break is then supplied via a plurality of supply points 33 into bridging links 42 formed therebetween, which are formed from short sections of the heat conductors 40. From there, the current flows into the additional conductor 3. After crossing the point of the break, the current is then distributed once again onto the bridging links 42 lying behind the point of the break and parts of the conductor strands 2, specifically those parts separated by the break.

In such a form of embodiment the additional conductor 3 can be integrated with the previous production processes for the contact electrodes 30. For this, one or more of the previous conductor strands 2, preferably non-insulated litz wires, of the contact electrodes 30 are replaced in their production by the conductor strands 3*a* of the additional conductor 3.

A meandering arrangement of the individual conductor strands 3*a* of the additional conductor contributes to increasing the strength of the additional conductor under tensile stress in its longitudinal direction.

As additional protection, the electrodes 30 as well as the heat conductors 40 and the additional conductors 3 comprise conductor strands 1, 2, 3*a* with a plastic core and gold-silver coating or nickel wires. Therein the heat conductors are provided, for a corresponding increase of their resistance, with a thin precious metal coating as the electrode conductor.

FIG. 4 shows a cross section of an electrical conductor strand 10 according to the invention which comprises a core of plastic and a jacketing of a precious metal.

The electrical conductor strand 10 comprises a filament-like inner strand 12 of an elastic, tear-resistant, and temperature-resistant plastic, in particular a thermoplastic plastic, in particular polyamide which is very break-resistant, tear-resistant, and temperature-resistant. The core 12 in the form of a thread is jacketed with a jacketing 14 of nickel, gold, silver, or a gold-silver alloy, which can be applied in particular by the electroplating method. The jacketing 14 is very ductile and thus very resistant to reverse bending stresses over a long period of operation. The core 12 is very tear-resistant and very resistant to reverse bending stresses so that the electrical conductor 10 has ideal mechanical properties and very good electrical properties, for example, for use as an electrical heat conductor or the like.

The core diameter can be between ca. 0.01 mm and ca. 1 mm, while a reasonable diameter for the jacketing 14 is ca. 0.02 to 3 mm. Furthermore, it can be provided that the inner strand 12 and the jacket layer 14 can have cross-sectional surfaces in a ratio from 1:4 and 10:1, preferably that the inner strand 12 and the jacket layer 14 have approximately equal cross-sectional surfaces.

Depending on the need, the equal cross-sectional surface of the core 12 can be greater than or less than that of the jacket 14. In the case of a conductor 10 which is exposed to particularly strong mechanical stress, it can be reasonable, for example, to choose the core diameter to be larger in order to reliably rule out a break or damage of the conductor 10 or the metallic jacket 14.

Several individual strands 16 in the form of electrical conductor strands 10 corresponding to FIG. 4 can in an advantageous manner, as FIG. 5 shows, be twisted to form a strand bundle 17 or to form a twine. Thus, for example, 30 to 50 individual strands 16 can be twisted to form one thread from which, in turn, several can be twisted to form one electrical total bundle 19. Thus, one conductor strand with a plurality of individual strands can be formed, where said conductor strand can be sewn without difficulties. If the conductor strand is pierced by a sewing needle, then only individual filaments are damaged without this affecting the overall function or the electrical or mechanical properties of the total bundle of the conductor strand to a noteworthy extent. In addition, the fixation by a sewing thread cannot lead to a mechanical break since the thread is very break-resistant.

In given cases, an additional insulation layer or adhesive layer (not represented) can be disposed around the jacketing 14, the additional layer preferably consisting of plastic.

The electrical conductor strand 10 or the entire bundle 19, which consists of a plurality of twisted electrical conductor strands 10, is suitable for the formation of electrical heating elements, in particular for installation in seats in vehicles or in steering wheels. In so doing, it can be provided as an electrode and/or as a heat conductor.

It can furthermore be provided that the additional conductor 3 is integrated into the electrode 3, and preferably insulated and/or spaced, at least between the end sections 36, 37 of the contact electrode 3.

It can, in particular, be provided that the additional conductor 3 is configured as an electrically conductive band and the conductor strands 2 for supplying electrical energy are fixed thereto. This band can, for example, be a meshwork of electrical conductor strands, a metal foil, a metallized fleece (for example, copper-coated or tin-coated), a knitted fabric and/or a woven fabric. It should have a surface resistance of under 5 m Ω/□. The conductor strands 2 can be sewed on or sewed in.

It can furthermore be provided that the end sections of at least one contact electrode 3 are connected, in an electrically conductive manner, to one another by an additional electrical conductor 3.

FIG. 6 shows a heating element 20 with a carrier 8 on which a heat conductor 40 is disposed so as to stretch essentially completely over the heating zone 100. The heat conductor 40 is formed from a conductor strand 1, preferably from an entire bundle 17 of individual strands. At each of its two ends the heat conductor 40 is connected, preferably crimped, in an electrically conductive manner, to a connecting line 50 in a contact zone 200. In this embodiment example the connecting line 50 is identical to the conductor strands 2 for supplying electrical energy and the connecting line 6. In this embodiment example current is supplied via a connecting line 50 into one end of the heat conductor 40. It then flows through the heat conductor 40 over its entire length and, in so doing, heats the heating zone 100. Then it is conducted via the other end of the heat conductor 40 at the contact zone 200 via the connecting line 50 back to the current source once again.

FIG. 7 shows a heating element that essentially resembles that of FIG. 1. Also here, a pair of electrodes 30 are disposed, so as to be spaced from one another and approximately parallel to one another, on a flat carrier 8. They are connected to one another at contact areas 200 via a plurality of heat conductors 40. However, no additional conductor 3 is provided here for bridging the electrodes 30. Instead of this, an interrupter conductor strand 4 runs next to each electrode 30. It can run in a meandering manner and on the same surface side of the carrier 8 with the electrodes 3. However, it is preferably disposed, as in the embodiment example, in a straight line and on a surface side of the flat carrier 8, specifically the surface side opposite the electrodes. At one of its ends it is connected, at a contact point 55 and in an electrically conductive manner, to the electrode 30. At its other end it is connected to a connecting point 57 via a connecting line 50 to a current source 70. In principle, one interrupter conductor strand 4 per heating element is sufficient. In the present embodiment example however, each of the two electrodes 30 is provided with its own interrupter conductor strand 4.

The interrupter conductor strand 4, due to its disposition in the form of a straight line on the one hand and due to a selective material/cross section configuration on the other hand, is mechanically less resistant than the electrodes 30. If the electrode should be exposed during operation to excessive mechanical stresses, then the interrupter conductor strand 4 disposed in the same mechanically stressed zone will break sooner than the electrode 30. Due to the electrical series circuit of interrupter conductor strand 4 and electrode 30, the heating element 20 is heated less or not at all if the interrupter conductor strand 4 is damaged or interrupted. In this way, the possibility of fire arising at the point of a break in the electrode is ruled out.

In addition or alternatively to the interrupter conductor strand 4, an additional interrupter conductor strand 4' can be disposed. In the present embodiment example heat does not flow through it. It is merely laid along at least one electrode 30, in the embodiment example here along both electrodes. Its ends are connected to a monitoring device 80. It can furthermore be provided that a temperature sensor 90 is inserted into the conductor loop of the interrupter conductor strand 4'. The resistance of the temperature sensor and the resistance of the interrupter conductor strand 4' are preferably different from one another by orders of magnitude. In this way, for example, a characteristic curve of an NTC used as a temperature sensor remains unchanged.

In operation the monitoring device 80 will monitor, using the temperature sensor 90, the operating temperature of the heating element and set the current flow through the heating element 20 appropriately. Should the interrupter conductor strand 4' be damaged or interrupted by excess mechanical stress, then the monitoring device 80 registers an increase in resistance of the conductor loop of the interrupter conductor strand 4', which increases as the extent of the damage increases. From this, it determines that there is a defect in the interrupter conductor strand 4' and/or at the temperature sensor. Both are cases in which the monitoring device 80 switches off the heating element completely.

It can be expedient if the interrupter conductor strand 4, 4' comprises several strands. If individual strands fail, this leads to an increased resistance of the interrupter conductor strand 4, 4'. This can also be registered by a monitoring device 80. In this way, preheating becomes possible. Furthermore, the heating element itself is simultaneously supplied with a smaller, less critical amount of current.

It is significant that an interrupter conductor strand 4, 4' is reliably insulated at least in a link section of the electrode 30, specifically a section which is to be monitored. Otherwise, short-circuits between the two could, in turn, bridge a damaged point.

LIST OF REFERENCE NUMBERS

1 Conductor strand for heating
2 Conductor strand for supplying electrical energy
3 Additional conductor
**3*a*** Conductor strand of the additional conductor
4, 4' Interrupter conductor strand
5 Edge of heating zone
6 Connecting line
8 Carrier
10 Electrical conductor strand
12 Inner strand
14 Jacketing layer
16 Individual strand
17 Strand bundle
19 Total bundle
20 Electrical heating element
30 Electrode
36, 37 End sections
40 Heat conductor
42 Bridging links
50 Connecting lines
55 Contact point
57 Connection point
70 Current source
80 Monitoring device
90 Temperature sensor
100 Heating zone
200 Contact area

The invention claimed is:

1. A heating element for heating user-contacted surfaces of a passenger compartment of a vehicle, comprising:

a) at least one heating zone in which a plurality of first electrical conductor strands are disposed approximately parallel to one another and are electrically connected in parallel for heating a passenger of the automotive vehicle;

b) a plurality of second conductor strands forming a contact electrode for supplying electrical energy into the plurality of first electrical conductor strands for heating the at least one heating zone;

c) a contact area in which the plurality of second conductor strands are connected, in an electrically conductive manner, to the plurality of first electrical conductor strands for heating the heating zone; and d) at least one additional third conductor strand for bridging electrical communication at a local failure with the plurality of first electrical conductor strands if the local failure of the plurality of second conductor strands occur, for bridging electrical communication at a local failure with the plurality of second conductor strands if the local failure of the plurality of first electrical conductor strands occurs, or both;

wherein the plurality of first electrical conductor strands includes at least one or a plurality of filament-like strands of plastic and at least one electrically conductive metal jacket layer jacketing the one or the plurality of filament-like plastic inner strands;

wherein at least some of the plurality of second conductor strands are made of copper litz wires; and wherein the at least one additional third conductor strand comprises a plurality of individual strands, and the at least one additional third conductor strand is integrated into the plurality of second conductor strands so that the at least one additional third conductor strand replaces at least one of the plurality of second conductor strands.

2. The heating element of claim 1, wherein the plurality of first electrical conductor strands are arranged to run in a meandering path and the plurality of second conductors runs along an edge of the heating zone.

3. The heating element of claim 1, wherein at least a part of the plurality of first electrical conductor strands cross at least a part of the at least one additional third conductor strand for supplying electrical energy to form a bridging link in case of a break of the plurality of second conductor strands.

4. The heating element of claim 1, wherein the jacket layer is an electroplated layer.

5. The heating element of claim 3, wherein the jacket layer is an electroplated layer.

6. The heating element of claim 2, wherein the jacket includes an outer surface layer that is passivized, chromatized, oxidized, or any combination thereof.

7. The heating element of claim 1, wherein at least one of the first electrical conductor strands, the plurality of second conductor strands, or the at least one additional third conductor strand includes at least 5 individual strands.

8. The heating element of claim 7, wherein the individual strands are electrically insulated with respect to one another at least in sections.

9. The heating element of claim 7, wherein the individual strands are combined to form a strand bundle and several strand bundles, bundles of strand bundles or both, are combined to form a total bundle, and wherein at least one strand bundle has a spiral arrangement and wherein the conductor strand, the strand bundle, the total bundle, or any combination of the three, further comprise an auxiliary conductive strand that is spirally wound around the conductor strand, the strand bundle, the total bundle, or any combination of the three, such that the spacing between adjacent windings is greater that the diameter of the auxiliary conductive strand.

10. The heating element of claim 1, wherein the at least one or the plurality of filament-like inner strands include a core and the core has a diameter of between about 0.01 mm and about 1 mm.

11. The heating element of claim 10, wherein the core is a thread that is jacketed by the at least one electrically conductive metal jacket layer.

12. The heating element of claim 1, wherein the plurality of second conductor strands or the at least one additional third conductor strand is laid on a textile and fastened by an additional sewing thread and/or glued to the textile.

13. A heating element for heating user-contacted surfaces of a passenger compartment of a vehicle, comprising:

a) at least one heating zone in which a plurality of first electrical conductor strands are disposed approximately parallel to one another and are electrically connected in parallel for heating a passenger of the automotive vehicle;

b) a plurality of second conductor strand forming an electrode for supplying electrical energy into the plurality of first electrical conductor strands for heating the at least one heating zone;

c) a contact area in which the plurality of second conductor strands are connected, in an electrically conductive manner, to the plurality of first conductor strand for heating the heating zone; and d) at least one additional third conductor strand for bridging electrical communication at a local failure with the plurality of first electrical conductor strands if the local failure of the plurality of second conductor strands occur, or for bridging electrical communication at a local failure with the plurality of second conductor strands if the local failure of the plurality of first electrical conductor strands occurs, the at least one additional third conductor strand being indirectly connected with a source of current in an electrically conductive manner via the plurality of second conductor strands; and wherein at least one of the first electrical conductor strands, the plurality of second conductor stands, or the at least one additional third conductor strand includes at least 5 individual strands and at least sections of the individual strands are electrically insulated with respect to one another;

wherein at least some of the plurality of second conductor strands are made of copper litz wires; and wherein the at least one additional third conductor strand comprises a plurality of individual strands, and the at least on additional third conductor strand is integrated into the plurality of second conductor strands to that the at least one additional third conductor strand replaces at least one of the plurality of second conductor strands.

14. The heating element of claim 13, wherein the heating element includes at least one or a plurality of filament-like inner strands and the at least one or the plurality of filament-like inner strands include a core and the core has a diameter of between about 0.01 mm and about 1 mm.

15. The heating element of claim 14, wherein the plurality of first electrical conductor strands include one or a plurality of filament-like inner strands that have a core made of thread that is jacketed by a jacket layer.

16. The heating element of claim 13, wherein the plurality of second conductor strands or the at least one additional third conductor strand is laid on a textile and fastened by an additional sewing thread and/or glued to the textile.

17. A heating element for heating user-contacted surfaces of a passenger compartment of a vehicle, comprising:

a) at least one heating zone in which a plurality of first electrical conductor strands are disposed approximately parallel to one another and are electrically connected in parallel for heating a passenger of the automotive vehicle;

b) a plurality of second conductor strands for supplying electrical energy into the plurality of first conductor strands for heating the at least one heating zone;

c) a contact area in which the plurality of second conductor strands are connected, in an electrically conductive manner, to the plurality of first conductor strands for heating the heating zone;

d) at least one additional third conductor strand for bridging electrical communication with the plurality of first electrical conductor strands if a local failure of the plurality of second conductor strands occurs, or for bridging electrical communication with the plurality of second electrical conductor strands if a local failure of one of the plurality of first electrical conductor strands occurs, the at least one additional third conductor strand is connected with a source of current, indirectly via the plurality of second electrical conductor strands;

wherein at least one of the first electrical condor strands, the plurality of second electrical conductor strands, or the at least one additional third conductor strand includes at least 5 individual strands and at least sections of the individual strands are electrically insulated with respect to one another;

wherein individual strands are combined to form a strand bundle and several strand bundles, bundles of strand bundles, or both, are combined to form a total bundle, and at least one strand bundle has a spiral arrangement; and wherein the conductor strand, the strand bundle, the total bundle, or any combination of the three, further comprise an auxiliary conductive strand that is spirally wound around the conductor strand, the strand bundle, the total bundle, or any combination of the three, such that the spacing between adjacent windings is greater than a diameter of the auxiliary conductive strand.

18. The heating element of claim 17, wherein the heating element includes at least one or a plurality of filament-like inner strands and the at least one or the plurality of filament-like inner strands include a core and the core has a diameter of between about 0.01 mm and about 1 mm.

19. The heating element of claim 18, wherein the plurality of first electrical conductor strands include one or a plurality of filament-like inner strands that have a core made of thread that is jacketed by a jacket layer:

20. The heating element of claim 19, wherein the jacket layer is an electroplated layer.

* * * * *